(12) United States Patent
Esser et al.

(10) Patent No.: US 8,192,580 B2
(45) Date of Patent: Jun. 5, 2012

(54) PREPARATION OF AQUEOUS SLURRIES OF FINELY DIVIDED FILLERS AND THEIR USE FOR THE PRODUCTION OF PAPERS HAVING A HIGH FILLER CONTENT AND HIGH DRY STRENGTH

(75) Inventors: Anton Esser, Limburgerhof (DE); Hans-Joachim Haehnle, Neustadt (DE); Marc Schroeder, Canton, MI (US)

(73) Assignee: BASF SE, Ludwigshafen (DE)

( * ) Notice: Subject to any disclaimer, the term of this patent is extended or adjusted under 35 U.S.C. 154(b) by 87 days.

(21) Appl. No.: 12/667,477

(22) PCT Filed: Jul. 4, 2008

(86) PCT No.: PCT/EP2008/058646
§ 371 (c)(1),
(2), (4) Date: Dec. 31, 2009

(87) PCT Pub. No.: WO2009/004080
PCT Pub. Date: Jan. 8, 2009

(65) Prior Publication Data
US 2010/0186915 A1    Jul. 29, 2010

(30) Foreign Application Priority Data

Jul. 5, 2007 (EP) .................................... 07111863

(51) Int. Cl.
*D21H 11/00* (2006.01)

(52) U.S. Cl. ......................................... 162/169; 523/334
(58) Field of Classification Search .................. 162/169; 523/334; 524/47
See application file for complete search history.

(56) References Cited

U.S. PATENT DOCUMENTS

2011/0230601 A1    9/2011    Nieberle et al.

FOREIGN PATENT DOCUMENTS

| DE | 41 05 919 | 8/1992 |
| DE | 102 09 448 | 9/2003 |
| GB | 1 505 641 | 3/1978 |
| WO | 03 087472 | 10/2003 |

OTHER PUBLICATIONS

U.S. Appl. No. 12/667,046, filed Dec. 29, 2009, Esser, et al.
U.S. Appl. No. 12/667,592, filed Jan. 4, 2010, Esser, et al.
U.S. Appl. No. 12/667,050, filed Dec. 29, 2009, Esser, et al.
U.S. Appl. No. 12/990,763, filed Nov. 2, 2010, Esser, et al.
U.S. Appl. No. 12/996,688, filed Dec. 7, 2010, Haehnle, et al.
U.S. Appl. No. 13/058,217, filed Feb. 9, 2011, Haehnle, et al.
U.S. Appl. No. 13/002,453, filed Jan. 3, 2011, Schmidt-Thuemmes, et al.
U.S. Appl. No. 13/376,509, filed Dec. 6, 2011, Jehn-Rendu, et al.
U.S. Appl. No. 13/147,623, filed Aug. 3, 2011, Esser, et al.

*Primary Examiner* — Mark Halpern
(74) *Attorney, Agent, or Firm* — Oblon, Spivak, McClelland, Maier & Neustadt, L.L.P.

(57) ABSTRACT

A process for treating aqueous slurries of finely divided fillers, wherein the treatment is carried out by heating an aqueous slurry of at least one finely divided filler and then by adding an aqueous dispersion of at least one latex.

11 Claims, No Drawings

PREPARATION OF AQUEOUS SLURRIES OF FINELY DIVIDED FILLERS AND THEIR USE FOR THE PRODUCTION OF PAPERS HAVING A HIGH FILLER CONTENT AND HIGH DRY STRENGTH

This application is a 371 of PCT/EP08/58646 filed 4 Jul. 2008.

The invention relates to a process for treating aqueous slurries of finely divided fillers and their use for the production of papers having high filler content and high dry strength.

In the production of filler-containing papers, the filler slurry is added to the fiber suspension before this is passed on to the former of the paper machine. As a rule, a retention aid or retention aid system is added to the filler/fiber suspension in order to retain as much filler as possible in the paper sheet. The addition of the filler to the paper enables the papermaker to achieve numerous improvements of the sheet properties. These include properties such as opacity, whiteness, haptic properties and printability.

If, in addition, the filler is cheaper than the fiber, the addition or increased addition of filler can lead to a reduction in the proportion of fiber and hence to a reduction in the production costs of paper. Filler-containing paper or papers having a particularly high filler content can be more easily dried than papers which do not contain filler and than papers having a lower filler content. As a consequence of this, the paper machine can be operated more rapidly and with lower steam consumption, which both increases the productivity and reduces the costs.

However, the addition of filler to the fiber suspension also has disadvantages which can only be partly compensated by the addition of further paper assistants. For a given basis weight, there are limits with regard to the amount of filler which can be used. The strength properties of the paper are usually the most important parameters which limit the amount of filler in the paper. Other factors too, such as the filler retention, the drainage of the paper stock suspension and any increased chemical demand during retention and sizing, can play a role here.

The loss of strength properties of paper can be completely or partly compensated in some cases by the use of dry and wet strength agents. A customary procedure is the addition of cationic starch as a dry strength agent to the paper stock. Synthetic dry and wet strength agents, for example based on cationic or anionic polyacrylamides, are also used. The added amount and the strengthening effect are, however, limited in most cases. Equally, the compensating effect with respect to the loss of strength by increasing the filler and therefore also the increase in filler which is at all realizable is also limited. In addition, not all strength properties are enhanced to the same degree and in some cases they are insufficiently enhanced by the use of dry strength agents.

An important example of this is the tear strength, which is influenced only slightly by the use of starch or synthetic dry strength agents in comparison with other strength parameters. On the other hand, the increase in the filler content in the paper generally has a very strong adverse effect on the tear strength.

Further important properties are the thickness and the stiffness of the paper. With the same basis weight, the increase of the filler content leads to an increase in paper density and a decrease in the thickness of the paper sheet. The latter leads to a considerable decrease in the paper stiffness. In many cases, this decrease in the paper stiffness cannot be compensated by the use of dry strength agents alone. Frequently, additional measures, such as, for example, the reduction of the mechanical pressure in the press section in the calendering units, in calenders or in the dry end of the paper machine, are necessary. The latter completely or partly compensates the loss of thickness by increasing the filler.

WO 03/087472 A1 discloses a process which describes the treatment of fillers with a composition consisting of swollen starch particles and latices. The latices used in this publication are water-insoluble and are present in the form of a dispersion. After separate preparation of this composition, it is added to the untreated filler slurry; finally, the addition to the fiber and the sheet formation are effected. According to the teaching of WO 03/087472 A1, the starch particles are swollen starch particles. Furthermore, the composition may also comprise other coadditives, such as anionic or cationic coadditives.

It was the object of the present invention to provide further alternative processes for treating aqueous slurries of finely divided fillers. The papers produced therewith should have strength properties which are comparable with those of conventional papers having a low filler content. These strength properties include in particular the dry breaking length, the internal bonding strength and the stiffness of the paper.

The object is achieved, according to the invention, by a process for treating aqueous slurries of finely divided fillers, the treatment being carried out by heating an aqueous slurry of at least one finely divided filler and then by adding an aqueous dispersion of at least one latex.

The aqueous slurries prepared by the process according to the invention comprise, for example, from 1 to 70% by weight, preferably from 5 to 50% by weight, particularly preferably from 10 to 40% by weight, of at least one finely divided filler. The amount of latex is, for example, from 0.01 to 10% by weight, preferably from 0.1 to 5% by weight, particularly preferably from 0.2 to 3% by weight, based on the filler.

According to the invention, the aqueous slurry of at least one finely divided filler is pretreated by heating before the addition of the aqueous dispersion of at least one latex. For example, the aqueous slurries are heated to a temperature of at least 40° C., preferably to at least 45° C., particularly preferably to at least 50° C. (in each case at atmospheric pressure), the boiling point (at atmospheric pressure) of the aqueous slurry of course not being exceeded.

The heating is usually effected by supplying energy. If the finely divided filler used is calcium carbonate, it is also possible to use the liberated heat in the precipitation of calcium carbonate from milk of lime on passing in carbon dioxide. The calcium carbonate slurry prepared in this manner is already sufficiently heated for the process according to the invention.

In practice, it is therefore possible, for example, to carry out the precipitation of the filler calcium carbonate at a filler manufacturer's premises. The filler slurry which is still warmed by the liberated heat of reaction is then treated by the process according to the invention by the addition of an aqueous dispersion of at least one latex. In this case, for increasing the storage stability and transport stability of the slurry, a dispersant, for example polyacrylic acid (Polysalz S®, BASF SE), is preferably added. Thereafter, the treated and dispersed slurry can be concentrated, for example by centrifuging to a solids content of up to 50%, preferably up to 60% and particularly preferably up to 65%. This slurry of finely divided fillers is finally both storable and transportable to the end processor in a paper mill.

Alternatively, for example, calcium carbonate as filler can first be treated by the process according to the invention by heating and addition of the aqueous dispersion of at least one latex, and the concentration to give a powder is then effected, for example by spray drying. The spray drying can, if appropriate, be effected with the use of a commercially available spray assistant, and it is even possible optionally to use the abovementioned dispersant. What is advantageous about this process variant is that the treated filler can be transported in the solid state, i.e. without water, to the end processor in the paper mill. The treated filler can be redispersed on site by addition of water.

In the context of the present invention, the term latex is understood as meaning water-insoluble homo- and copolymers which are preferably used in the form of dispersions or emulsions.

The latex preferably comprises at least 40% by weight, preferably at least 60% by weight, particularly preferably at least 80% by weight, of so-called main monomers (a).

The main monomers (a) are selected from $C_1$-$C_{20}$-alkyl (meth)acrylates, vinyl esters of carboxylic acids comprising up to 20 carbon atoms, vinyl aromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers.

For example, alkyl (meth)acrylates having a $C_1$-$C_{10}$-alkyl radical, such as methyl methacrylate, methyl acrylate, n-butyl acrylate, ethyl acrylate and 2-ethylhexyl acrylate, may be mentioned.

In particular, mixtures of the alkyl(meth)acrylate are also suitable.

Vinyl esters of carboxylic acids having 1 to 20 carbon atoms are, for example, vinyl laurate, vinyl stearate, vinyl propionate, vinyl versatate and vinyl acetate.

Suitable vinylaromatic compounds are vinyltoluene, α- and p-methylstyrene, α-butylstyrene, 4-n-butylstyrene, 4-n-decylstyrene and preferably styrene. Examples of nitriles are acrylonitrile and methacrylonitrile.

The vinyl halides are ethylenically unsaturated compounds substituted by chlorine, fluorine or bromine, preferably vinyl chloride and vinylidene chloride. For example, vinyl methyl ether or vinyl isobutyl ether may be mentioned as vinyl ethers. Vinyl ethers of alcohols comprising 1 to 4 carbon atoms are preferred.

Ethylene, propylene, butadiene, isoprene and chloroprene may be mentioned as aliphatic hydrocarbons having 2 to 8 carbon atoms and one or two olefinic double bonds.

Preferred main monomers (a) are $C_1$-$C_{20}$-alkyl(meth)acrylates and mixtures of the alkyl(meth)acrylates with vinylaromatics, in particular styrene (was also summarized as polyacrylate latex) or hydrocarbons having 2 double bonds, in particular butadiene, or mixtures of such hydrocarbons with vinylaromatics, in particular styrene (also summarized as polybutadiene latex).

In the case of polyacrylate latices, the weight ratio of alkyl(meth)acrylates to vinylaromatics (in particular styrene) may be, for example, from 10:90 to 90:10, preferably from 20:80 to 80:20.

In the case of polybutadiene latices, the weight ratio of butadiene to vinylaromatics (in particular styrene) may be, for example, from 10:90 to 90:10, preferably from 20:80 to 80:20.

In addition to the main monomers (a), the latex may comprise further monomers (b), for example monomers having carboxyl, sulfo or phosphonic acid groups. Carboxyl groups are preferred. For example, acrylic acid, methacrylic acid, itaconic acid, maleic acid or fumaric acid and aconitic acid may be mentioned. The content of ethylenically unsaturated acids in the latex is in general less than 10% by weight.

Further monomers (b) are, for example, monomers comprising hydroxyl groups, in particular $C_1$-$C_{10}$-hydroxyalkyl (meth)acrylates, or amides, such as (meth)acrylamide.

Further monomers (b) are compounds which have at least two double bonds capable of free radical polymerization, preferably 2 to 6, particularly preferably 2 to 4, very particularly preferably 2 or 3 and in particular 2. Such compounds are also referred to as crosslinking agents.

The at least two double bonds of the crosslinking agents (b) which are capable of free radical polymerization may be selected from the group consisting of (meth)acryloyl, vinyl ether, vinyl ester, allyl ether and allyl ester groups. Examples of crosslinking agents (b) are 1,2-ethanediol di(meth)acrylate, 1,3-propanediol di(meth)acrylate, 1,2-propanediol di(meth)acrylate, 1,4-butanediol di(meth)acrylate, 1,6-hexanediol di(meth)acrylate, neopentylglycol di(meth)acrylate, trimethylolpropanetriol di(meth)acrylate, pentaerythrityl tetra(meth)acrylate, 1,4-butanediol divinyl ether, 1,6-hexanediol divinyl ether, 1,4-cyclohexanediol divinyl ether, divinylbenzene, allyl acrylate, allyl methacrylate, methallyl acrylate, methallyl methacrylate, but-3-en-2-yl(meth)acrylate, but-2-en-1-yl(meth)acrylate, 3-methylbut-2-en-1-yl (meth)acrylate, esters of (meth)acrylic acid with geraniol, citronellol, cinnamic alcohol, glyceryl mono- or diallyl ether, trimethylolpropane mono- or diallyl ether, ethylene glycol monoallyl ether, diethylene glycol monoallyl ether, propylene glycol monoallyl ether, dipropylene glycol monoallyl ether, 1,3-propanediol monoallyl ether, 1,4-butanediol monoallyl ether and furthermore diallyl itaconate. Allyl acrylate, divinylbenzene, 1,4-butanediol diacrylate and 1,6-hexanediol diacrylate are preferred.

Preferably used polyacrylate latices are those which are composed of vinyl aromatics, $C_1$-$C_{20}$-alkyl(meth)acrylates and furthermore hydrophilic monomers, such as, for example, (meth)acrylonitrile, (meth)acrylamide and (meth) acrylic acid. For example, such preferred polyacrylate latices comprise 20-50% by weight of styrene, 30-80% by weight of $C_1$-$C_{20}$-alkyl(meth)acrylates and 0-30% by weight of further hydrophilic monomers, such as, for example, (meth)acrylonitrile, (meth)acrylamide and (meth)acrylic acid.

The latices are prepared as a rule by emulsion polymerization and the polymer is therefore an emulsion polymer. The preparation of aqueous polymer dispersions by the free radical emulsion polymerization process is known per se (cf. Houben-Weyl, Methoden der organischen Chemie, volume XIV, Makromolekulare Stoffe, loc. cit., page 133 et seq.).

In the emulsion polymerization for the preparation of the latices, ionic and/or nonionic emulsifiers and/or protective colloids or stabilizers are used as surface-active compounds. The surface-active substance is usually used in amounts of from 0.1 to 10% by weight, in particular from 0.2 to 3% by weight, based on the monomers to be polymerized.

Customary emulsifiers are, for example, ammonium or alkali metal salts of higher fatty alcohol sulfates, such as sodium n-laurylsulfate, fatty alcohol phosphates, ethoxylated $C_8$- to $C_{10}$-alkyl phenols having a degree of ethoxylation of from 3 to 30 and ethoxylated $C_8$- to $C_{25}$-fatty alcohols having a degree of ethoxylation of from 5 to 50. Mixtures of nonionic and ionic emulsifiers are also conceivable. Ethoxylated and/or propoxylated alkylphenols and/or fatty alcohols containing phosphate or sulphate groups are furthermore suitable. Further suitable emulsifiers are mentioned in Houben-Weyl, Methoden der organischen Chemie, volume XIV, Makromolekulare Stoffe, Georg Thieme Verlag, Stuttgart, 1961, pages 192 to 209.

Water-soluble initiators for the emulsion polymerization for the preparation of the latices are, for example, ammonium and alkali metal salts of peroxodisulfuric acid, e.g. sodium peroxodisulfate, hydrogen peroxide or organic peroxides, e.g. tert-butyl hydroperoxide. So-called reduction-oxidation (redox) initiator systems are also suitable.

The amount of initiators is in general from 0.1 to 10% by weight, preferably from 0.5 to 5% by weight, based on the monomers to be polymerized. It is also possible to use a plurality of different initiators in the emulsion polymerization.

Regulators may be used in the emulsion polymerization, for example in amounts of from 0 to 3 parts by weight, based on 100 parts by weight of the monomers to be polymerized, by means of which the molar mass is reduced. For example, compounds having a thiol group, such as tert-butyl mercaptan, thioglycolic acid ethyl acrylate, mercaptoethynol, mercaptopropyltrimethoxysilane or tert-dodecyl mercaptan or regulators without a thiol group, in particular, for example, terpinolene, are suitable.

The emulsion polymerization for the preparation of the latices is effected as a rule at from 30 to 130° C., preferably at from 50 to 100° C. The polymerization medium may consist either only of water or of mixtures of water and liquids miscible therewith, such as methanol. Preferably, only water is used. The emulsion polymerization can be carried out both as a batch process and in the form of a feed process, including step or gradient procedure. The feed process is preferred, in which a part of the polymerization batch is initially taken, heated to the polymerization temperature and prepolymerized and the remainder of the polymerization batch is then fed to the polymerization zone continuously, stepwise or with superposition of a concentration gradient, usually over a plurality of spatially separate feeds, one or more of which comprise the monomers in pure or in emulsified form, while maintaining the polymerization. In the polymerization, a polymer seed may also be initially taken, for example for better adjustment of the particle size.

The manner in which the initiator is added to the polymerization vessel in the course of the free radical aqueous emulsion polymerization is known to the average person skilled in the art. It can either be completely initially taken in the polymerization vessel or used continuously or stepwise at the rate of its consumption in the course of the free radical aqueous emulsion polymerization. Specifically, this depends on the chemical nature of the initiator system as well as on the polymerization temperature. Preferably, a part is initially taken and the remainder is fed to the polymerization zone according to the rate of consumption.

For removing the residual monomers, initiator is usually also added after the end of the actual emulsion polymerization, i.e. after a monomer conversion of at least 95%.

In the feed process, the individual components can be added to the reactor from above, at the side or from below through the reactor base.

After the (co)polymerization the acid groups present in the latex can also be at least partly neutralized. This can be effected, for example, with oxides, hydroxides, carbonates or bicarbonates of alkali metals or alkaline earth metals, preferably with hydroxides, with which any desired opposite ion or a plurality of opposite ions may be associated, e.g. $Li^+$, $Na^+$, $K^+$, $Cs^+$, $Mg^{2+}$, $Ca^{2+}$ or $Ba^{2+}$. Ammonia or amines are furthermore suitable for the neutralization. Aqueous ammonium hydroxide, sodium hydroxide or potassium hydroxide solutions are preferred.

In the emulsion polymerization, aqueous dispersions of the latices having as a rule solids contents of from 15 to 75% by weight, preferably from 40% to 75% by weight, are obtained.

The glass transition temperature Tg of the latices is, for example, in the range from −30 to 100° C., preferably in the range from −5 to 70° C. and particularly preferably in the range from 0 to 40° C. (measured by the DSC method according to DIN EN ISO 11357).

The particle size of the latices is preferably in the range from 10 to 1000 nm, particularly preferably in the range from 50 to 300 nm (measured using a Malvern® Autosizer 2 C).

The aqueous dispersions of at least one latex are used according to the invention for treating finely divided fillers which are heated beforehand. Suitable fillers are all pigments which can usually be used in the paper industry and comprise inorganic material, e.g. calcium carbonate, which can be used in the form of ground calcium carbonate (GCC), chalk, marble or precipitated calcium carbonate (PCC), talc, kaolin, bentonite, satin white, calcium sulfate, barium sulfate or titanium dioxide. Mixtures of two or more pigments can also be used. The mean particle diameter is, for example, in the range from 0.5 to 30 µm, preferably from 1 to 10 µm.

Furthermore, the aqueous slurries of finely divided fillers may also comprise up to 5% by weight, preferably up to 1% by weight, particularly preferably from 0.01 to 0.3% by weight, of coadditives. These are preferably added last to the heated aqueous slurry of the at least one finely divided filler, i.e. after the addition of the aqueous dispersion of the at least one latex.

In the context of the present invention, coadditives are understood as meaning both anionic and cationic coadditives. Anionic coadditives are, for example, carboxymethyl-cellulose, polyacrylic acid, anionic polyacrylamide, alginate and inorganic components, such as colloidal silica and bentonite. Suitable cationic coadditives are, for example, chitosan, polyvinylamine, polyethyleneimine, polydialkyldimethylammonium chloride, alum, polyaluminum chloride and trivalent and tetravalent cations.

As described above, according to the invention, the preparation of an aqueous slurry of finely divided fillers is first effected by heating the aqueous slurry of at least one finely divided filler. The addition of the aqueous dispersion of at least one latex to this heated aqueous slurry of at least one finely divided filler is then effected. The fillers are processed, for example, by introduction into water to give an aqueous slurry. Precipitated calcium carbonate is usually suspended in water in the absence of dispersants. In order to prepare aqueous slurries of the other fillers, as a rule an anionic dispersant, e.g. polyacrylic acid having an average molar mass $M_w$ of, for example, from 1 000 to 40 000 dalton, is used. If an anionic dispersant is used, for example, from 0.01 to 0.5% by weight, preferably from 0.2 to 0.3% by weight, thereof is employed for the preparation of aqueous filler slurries. The finely divided fillers dispersed in water in the presence of anionic dispersants are anionic. The aqueous slurries comprise, for example, from 10 to 30% by weight, in general 15-25% by weight, of at least one filler.

In a further embodiment of the process according to the invention, the aqueous dispersion of at least one latex is additionally treated or destabilized by the following measures:
a) change of pH,
b) addition of inorganic ions having an opposite charge to the latex dispersion, in particular addition of ions such as $Ca^{2+}$ or $Al^{3+}$,
c) addition of multiply charged organic compounds which have an opposite charge to the latex dispersion,
d) addition of polyelectrolytes which have an opposite charge to the latex dispersion, e) addition of organic solvents, such as, for example, acetone, or f) addition of hydrophobic opposite ions, such as, for example, tetraalkylammonium ions.

The treatment of the aqueous slurry of finely divided fillers with the latices and, if appropriate, the coadditives, which is effected after the heating, can be carried out continuously or batchwise.

The mixing of the components is effected, for example, in a shear field. In general, it is sufficient if the components are stirred or are treated in a shear field of Ultraturrax apparatus after combination. The combination and mixing of the constituents of the aqueous slurries can be effected, for example, in the temperature range from 0° C. to 80° C., preferably from 10 to 50° C. In general, the components are mixed at the respective room temperature up to a temperature of 40° C. The pH of the aqueous slurries of finely divided fillers, which slurries have been treated with latices, and, if appropriate, coadditives, is, for example, from 5 to 11, preferably from 6 to 9, the pH of slurries comprising calcium carbonate preferably being more than 6.5.

On combining untreated, i.e. unheated, aqueous slurries of finely divided fillers and aqueous dispersions of latices, the filler particles are at least partly coated or impregnated with the latices. The prior heating of the aqueous slurries of at least one finely divided filler and subsequent addition of the aqueous dispersion of at least one latex may result in increased to complete absorption of the latex particles on the pigment surface.

The invention furthermore relates to the use of the aqueous slurries prepared according to the process of the invention as an additive to the paper stock in the production of filler-containing paper, filler-containing cardboard or filler-containing board by drainage of the paper stock.

Specifically, these are filler-containing papers such as, for example, wood-free uncoated printing, writing or copying paper and wood-containing uncoated papers such as, for example, recycled newsprint or SC papers for the offset or gravure printing sector. By treatment of the filler added to the paper with at least one latex in combination with at least one swollen starch, the filler content of the paper can be substantially increased with virtually unchanged strength properties. The filler-containing papers, cardboards and boards obtained using the aqueous slurries prepared according to the process of the invention have strength properties which are comparable with those of conventional papers having a low solids content.

The fillers treated by the process described above are mixed with the fiber in order thus to form the total paper stock. In addition to the treated fillers and fibers the total stock may also comprise other conventional paper additives. These include, for example, sizes, such as alkylketene dimers (AKD), alkenylsuccinic anhydrides (ASA), rosin size, wet strength agents, cationic or anionic retention aids based on synthetic polymers. Suitable retention aids are, for example, anionic microparticles (colloidal silica, bentonite), anionic polyacrylamides, cationic polyacrylamides, cationic starch, cationic polyethylenimine or cationic polyvinylamine. In addition, any desired combinations thereof are conceivable, such as, for example, dual systems, which consist of a cationic polymer with an anionic microparticle or an anionic polymer with a cationic microparticle.

The invention is explained in more detail with reference to the following, nonlimiting examples.

The stated percentages in the examples are percentages by weight, unless evident otherwise from the context.

EXAMPLE 1a

A 20% strength by weight aqueous slurry of precipitated calcium carbonate (PCC) was firstly heated to 60° C. with gentle stirring. 1.8 g of a 50% strength by weight dispersion of an anionic latex (Catiofast® PR 5335 X, BASF SE) were then mixed with 150 g of this aqueous PCC slurry with gentle stirring. During the addition and thereafter, the mixture was stirred with the aid of a Heiltof stirrer at 1000 revolutions per minute (rpm). The pH of the mixture was then adjusted to 8.5.

EXAMPLE 1b

A 20% strength by weight aqueous slurry of precipitated calcium carbonate (PCC) was firstly heated to 60° C. with gentle stirring. 1.8 g of a 50% strength by weight dispersion of an anionic latex (Catiofast® PR 8335 X, BASF SE) were then mixed with 150 g of this aqueous PCC slurry with gentle stirring. During the addition and thereafter, the mixture was stirred with the aid of a Heiltof stirrer at 1000 revolutions per minute (rpm). Thereafter, 1.5 ml of an aqueous dispersant (Polysalz S®, BASF SE) diluted beforehand to a solids content of 10% were then added with stirring (500 rpm). The mixture was then centrifuged in a laboratory centrifuge at 500 rpm, with the result that the solids content of the mixture had completely settled. The clear supernatant was then removed to such an extent that the total mixture had a solids content of 60%. The centrifugate was then mixed thoroughly with the supernatant. The mixture prepared in this manner showed only a slight tendency to sedimentation in the following days and weeks and could be redispersed at any time by gentle stirring.

EXAMPLE 2

A 30% strength by weight aqueous slurry of a commercially available kaolin clay (PCC) was firstly heated to 60° C. with gentle stirring. 2.7 g of a 50% strength by weight dispersion of an anionic latex (Catiofast® PR 5335 X, BASF SE) were then mixed with 150 g of this aqueous kaolin slurry with gentle stirring. During the addition and thereafter, the mixture was stirred with the aid of a Heiltof stirrer at 1000 revolutions per minute (rpm). The pH of the mixture was then adjusted to 8.5.

COMPARATIVE EXAMPLE 1

According to WO 03/087472 A1

A cationic waxy corn starch having a degree of substitution DS=0.035 was suspended in water at 25° C. to give a 20% strength by weight slurry. 1.8 g of a 50% strength by weight dispersion of an anionic latex (Catiofast® PR 5335 X, BASF SE) were mixed with the starch slurry with gentle stirring. The mixture of starch and latex was then diluted with 400 ml of hot water (75° C.) and gently stirred for 90 seconds. 25 ml of this dilute starch-latex slurry were then taken and were placed in a beaker. 150 g of a 20% strength by weight aqueous slurry of precipitated calcium carbonate (PCC) which was adjusted beforehand to a temperature of 25° C. were then added. During the addition and thereafter, the mixture was stirred with the aid of a Heiltof stirrer at 1000 revolutions per minute (rpm). The pH of the mixture was then adjusted to 8.5.

COMPARATIVE EXAMPLE 2

According to WO 03/087472 A1

A cationic waxy corn starch having a degree of substitution DS=0.035 was suspended in water at 25° C. to give a 30% strength by weight slurry. 2.7 g of a 50% strength by weight dispersion of an anionic latex (Catiofast® PR 5335 X, BASF SE) were mixed with the starch slurry with gentle stirring. The mixture of starch and latex was then diluted with 400 ml of hot water (75° C.) and gently stirred for 90 seconds. 25 ml of this dilute starch-latex slurry were then taken and were placed in a beaker. 150 g of a 30% strength by weight aqueous slurry of a commercially available kaolin clay which was adjusted beforehand to a temperature of 25° C. were then added. During the addition and thereafter, the mixture was stirred with the aid of a Heiltof stirrer at 1000 revolutions per minute (rpm). The pH of the mixture was then adjusted to 8.5.

COMPARATIVE EXAMPLE 3

The temperature of a 20% strength by weight aqueous slurry of precipitated calcium carbonate (PCC) was first adjusted to 25° C. with gentle stirring. 1.8 g of a 50% strength by weight dispersion of an anionic latex (Catiofast® PR 5335 X, BASF SE) were then mixed with 150 g of this aqueous PCC slurry with gentle stirring. During the addition and thereafter, the mixture was stirred with the aid of a Heiltof stirrer at 1000 revolutions per minute (rpm). The pH of the mixture was then adjusted to 8.5.

COMPARATIVE EXAMPLE 4

The temperature of a 30% strength by weight aqueous slurry of a commercially available kaolin clay was first adjusted to 25° C. with gentle stirring. 2.7 g of a 50% strength by weight dispersion of an anionic latex (Catiofast® PR 5335 X, BASF SE) were then mixed with 150 g of this aqueous kaolin slurry with gentle stirring. During the addition and thereafter, the mixture was stirred with the aid of a Heiltof stirrer at 1000 revolutions per minute (rpm). The pH of the mixture was then adjusted to 8.5.

Production of Filler-Containing Paper
Papers of Type A

EXAMPLES 3-5

COMPARATIVE EXAMPLES 5-13

A mixture of bleached birch sulfate and bleached pine sulfite was beaten gel-free in the ratio of 70/30 at a solids concentration of 4% in a laboratory pulper until a freeness of 30-35 was reached. An optical brightener (Blankophor® PSG, Bayer AG) and a cationic starch (HiCat® 5163 A) were then added to the beaten stock. The digestion of the cationic starch was effected as 10% strength by weight starch slurry in a jet digester at 130° C. and with a residence time of 1 minute. The metered amount of the optical brightener was 0.5% by weight of commercial product, based on the solids content of the paper stock suspension. The metered amount of the cationic starch was 0.5% by weight of starch, based on the solids content of the paper stock suspension. The pH of the stock was in the range from 7 to 8. The beaten stock was then diluted to a solids concentration of 0.35% by weight by addition of water.

In order to determine the behavior of the aqueous filler slurries described above in the production of filler-containing paper, in each case 500 ml of the paper stock suspension were initially taken and in each case the slurries treated according to the examples and a cationic polyacrylamide as a retention aid (Polymin® KE 440, BASF SE) were metered into this pulp. The metered amount of the retention aid was in all cases 0.01% by weight of polymer, based on the solids content of the paper stock suspension.

Sheets with the pretreated fillers described above were then formed (examples 3-5 and comparative examples 5-10). The amount of filler used for this purpose was adapted so that the filler contents were about 20%, 30% and 40%. In the case of the treated fillers, the amount of slurry which has to be used in order to achieve a certain target value is always smaller than in the case of the untreated fillers.

In addition, comparative examples with untreated filler were carried out for each of the treated filler types (comparative examples 11-13). For this purpose, the amount of untreated filler slurry which is required in order to establish a filler content of about 20%, 30% and 40% was first determined in preliminary experiments. Sheets with the untreated fillers were then formed.

The paper sheets were produced in each case on a Rapid-Kothen sheet former according to ISO 5269/2, with a sheet weight of 70 g/m$^2$, and then dried for 7 minutes at 90° C.

Papers of Type B

EXAMPLES 6-8

COMPARATIVE EXAMPLES 14-22

A mixture of TMP (thermomechanical pulp) and groundwood was beaten gel-free in the ratio of 70/30 at a solids concentration of 4% in a laboratory pulper until a freeness of 45 SR was reached. The pH of the stock was in the range from 7 to 8. The beaten stock was diluted to a solids concentration of 0.35% by weight by addition of water.

In order to determine the behavior of the aqueous filler slurries described above in the production of filler-containing paper, in each case 500 ml of the paper stock suspension were initially taken and in each case the slurries treated according to the examples and the comparative examples and a cationic polyacrylamide as a retention aid (Polymin® KE 440, BASF SE) were metered into this pulp. The metered amount of the retention aid was in each case 0.01% by weight of polymer, based on the solids content of the paper stock suspension.

Sheets with the treated fillers described above were then formed (examples 6-8 and comparative examples 14-19). The amount of filler used for this purpose was adapted so that the filler contents were about 20%, 30% and 40%. In the case of the pretreated fillers, the amount of slurry which has to be used in order to achieve a certain target value is always smaller than in the case of the untreated fillers.

In addition, comparative examples with untreated filler were carried out for each of the treated filler types (comparative examples 20-22). For this purpose, the amount of untreated filler slurry which is required for establishing a filler content of about 20%, 30% and 40% was first determined in preliminary experiments. Sheets with the untreated fillers were then formed.

The paper sheets were produced in each case on a Rapid-Kö then sheet former according to ISO 5269/2, with a sheet weight of 80 g/m$^2$, and then dried for 7 minutes at 90° C. and then calendered with a nip pressure of 200 N/cm.

Testing of the Paper Sheets of Type A

After a storage time in a conditioned chamber at a constant 23° C. and 50% relative humidity for 12 hours, the dry breaking length of the sheets was determined according to DIN 54540 and the internal bonding strength according to DIN 54516 and the stiffness according to DIN 53121. The results are stated in table 1. The slurries corresponding to the comparative examples or the comparative examples with the paper sheets produced therefrom are characterized by the addition (CE). The other examples are examples according to the invention.

Testing of the Paper Sheets of Type B

After a storage time in a conditioned chamber at a constant 23° C. and 50% relative humidity for 12 hours, the dry breaking length of the sheets was determined according to DIN 54540 and the internal bonding strength according to DIN 54516. The dry pick resistance of the papers was determined using the IGT printability tester (ISO 3783). The results are stated in table 2. The slurries corresponding to the comparative examples or the comparative examples with the paper sheets produced therefrom are characterized by the addition (CE). The other examples are examples according to the invention.

TABLE 1

(Testing of the paper sheets of type A)

| Example or comparative example (CE) | Slurry according to example or comparative example (CE) | Filler content [%] | Dry breaking length [m] | Internal bonding strength [N] | Stiffness [mN] |
|---|---|---|---|---|---|
| 3a | 1a | 20.3 | 5211 | 313 | 79.1 |
| 4a | 1a | 29.1 | 4416 | 247 | 60.3 |
| 5a | 1a | 39.7 | 3917 | 212 | 44.2 |
| 3b | 1b | 20.4 | 5122 | 303 | 76.1 |
| 4b | 1b | 28.9 | 4314 | 251 | 61.8 |
| 5b | 1b | 39.6 | 4011 | 105 | 45.9 |
| 5 (CE) | 1 (CE) | 21.2 | 5135 | 211 | 74.1 |
| 6 (CE) | 1 (CE) | 31.7 | 4447 | 169 | 53.5 |
| 7 (CE) | 1 (CE) | 38.9 | 3735 | 129 | 39.4 |
| 8 (CE) | 3 (CE) | 20.7 | 4422 | 231 | 74.3 |
| 9 (CE) | 3 (CE) | 29.2 | 3355 | 154 | 49.8 |
| 10 (CE) | 3 (CE) | 39.4 | 2634 | 99 | 31.6 |
| 11 (CE) | PCC without pretreatment | 20.2 | 4054 | 199 | 72.3 |
| 12 (CE) | PCC without pretreatment | 30.3 | 3048 | 134 | 41.2 |
| 13 (CE) | PCC without pretreatment | 39.6 | 2221 | 72 | 27.1 |

TABLE 2

(Testing of the paper sheets of type B)

| Example or comparative example (CE) | Slurry according to example or comparative example (CE) | Filler content [%] | Dry breaking length [m] | Internal bonding strength J/sqm | IGT |
|---|---|---|---|---|---|
| 6 | 2 | 20.1 | 4345 | 321 | very good |
| 7 | 2 | 30.8 | 3337 | 251 | very good |
| 8 | 2 | 39.2 | 2623 | 219 | good |
| 14 (CE) | 2 (CE) | 21.5 | 3876 | 243 | very good |
| 15 (CE) | 2 (CE) | 30.2 | 2976 | 189 | good |
| 16 (CE) | 2 (CE) | 39.9 | 2274 | 149 | moderate |
| 17 (CE) | 4 (CE) | 20.2 | 3599 | 246 | good |
| 18 (CE) | 4 (CE) | 29.8 | 2834 | 171 | moderate |
| 19 (CE) | 4 (CE) | 39.1 | 2188 | 112 | poor |
| 20 (CE) | kaolin clay without pretreatment | 18.9 | 3275 | 206 | good |
| 21 (CE) | kaolin clay without pretreatment | 30.5 | 2451 | 146 | poor |
| 22 (CE) | kaolin clay without pretreatment | 41.1 | 1790 | 88 | poor |

We claim:

1. A process comprising treating an aqueous slurry of finely divided fillers, wherein the treatment is carried out by heating the slurry comprising at least one finely divided filler to a temperature of at least 45° C. (at atmospheric pressure) and then by adding an aqueous dispersion of at least one latex to the heated filler-containing slurry.

2. The process according to claim 1, wherein the aqueous slurry comprises from 1 to 70% by weight of at least one finely divided filler.

3. The process according to claim 1, wherein the amount of latex is from 0.01 to 10% by weight, based on the filler.

4. The process according to claim 1, wherein the latex comprises at least 40% by weight of main monomers (a) which are selected from the group consisting of $C_1$-$C_{20}$-alkyl (meth)acrylates, vinyl esters of carboxylic acids comprising up to 20 carbon atoms, vinyl aromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds and mixtures of these monomers.

5. The process according to claim 1, wherein the latex is comprising at least 40% by weight of butadiene or mixtures of butadiene and styrene or of at least 40% by weight of $C_1$-$C_{20}$-alkyl (meth)acrylates or mixtures of $C_1$-$C_{20}$-alkyl (meth)acrylates with styrene.

6. The process according to claim 1, wherein the latex comprises 20-50% by weight of styrene, 30-80% by weight of $C_1$-$C_{20}$-alkyl (meth)acrylates and 0-30% by weight of further hydrophilic monomers.

7. The process according to claim 1, wherein the aqueous slurry comprises from 5 to 50% by weight of at least one finely divided filler.

8. The process according to claim 1, wherein the aqueous slurry comprises from 10 to 40% by weight of at least one finely divided filler.

9. The process according to claim 1, wherein the amount of latex is from 0.1 to 5% by weight, based on the filler.

10. The process according to claim 1, wherein the amount of latex is from 0.2 to 3% by weight, based on the filler.

11. The process according to claim 1, wherein the slurry comprising at least one finely divided filler is heated to a temperature of at least 50° C. (at atmospheric pressure).

* * * * *